3,240,826
SELECTIVE FLUORINATION OF POLYHALO-ETHANES
Ralph A. Davis, Midland, Mich., assignor to The Dow Chemical Company, Midland, Mich., a corporation of Delaware
No Drawing. Filed Jan. 22, 1962, Ser. No. 167,899
8 Claims. (Cl. 260—653.8)

The present invention relates to the selective fluorination of polyhaloethanes. More particularly, this invention is concerned with the selective replacement by fluorine of a bromine in an appropriate polyhaloethane by means of a pentavalent antimony fluorochloride fluorinating agent.

It is an object of this invention to provide a process for the replacement of bromine by fluorine in a polyhaloethane having the general formula $CF_2XCBr_2Y$, wherein X may be fluorine or bromine, and Y may be hydrogen or bromine.

It is a further object of this invention to provide a process for the fluorination of polyhaloethanes by which bromine on the organic molecule is selectively replaced by fluorine, the rest of the polyhaloethane molecule being unaffected.

Other objects and advantages of the present invention will become apparent in the course of the following specification.

The objects of this invention are readily accomplished by the use of pentavalent antimony, in the form of $$SbF_4Cl$$

as the fluorinating agent for a haloethane having the hereinbefore specified formula at temperatures from about 35 to about 120 degrees centigrade for an appropriate reaction time.

Typical polyhaloethanes suitable as starting materials in the present invention and represented by the general formula $CF_2XCBr_2Y$ are, $CF_3CBr_3$, $CF_2BrCHBr_2$, and $CF_3CHBr_2$.

A fluorinating agent having the effective formula $SbF_4Cl$ may be prepared as by mixing and heating $SbF_5$ with $SbCl_5$ in an optimum molar ratio of 4:1. Molar ratios of from about 3:2 to about 4.5:1 are operable, but molar ratios of from about 3.5:1 to about 4.5:1 are preferred for use in the process of this invention. Preparation of the fluorinating agent may be carried out in any suitable vessel, for example, a Monel flask, or may be prepared in the reaction vessel immediately prior to fluorination by simply adding the appropriate materials and heating.

Fluorination is begun by placing or preparing $SbF_4Cl$ catalyst in an appropriate reaction vessel, such as a Monel flask. To the fluorinating agent in the reaction vessel is added the polyhaloethane which is to be fluorinated. For best results, reactants are added in stoichiometric quantities, about 1 mole $SbF_4Cl$ being used for each atom of bromine to be replaced by fluorine on the organic molecule. In order to speed the reaction and insure sufficient fluorination, excess $SbF_4Cl$ may be used. Care should be taken, when excess $SbF_4Cl$ is used, that undesirable over-fluorination does not occur. The reaction mixture is then heated until the desired degree of fluorination is attained. Generally from about twenty minutes to about an hour and a half is sufficient. After fluorination, products and bromine may be separately removed from the reaction mixture, as by fractional distillation. If desired, bromine may be removed from the products as by washing with cold, aqueous NaOH.

Appropriate temperatures at which the reaction may be carried out are generally dependent on the boiling points of starting materials and intermediate products. High temperatures may cause distillation of material before the desired degree of fluorination has occurred, or before fluorination takes place at all. At atomspheric pressures, the reaction is generally carried out at reflux temperature, usually from about 35 degrees centigrade to about 120 degrees centigrade, preferably at a reflux temperature of from about 50 to about 80 degrees centigrade. Of course, if temperatures higher than the boiling point of the reactants or reaction products are employed, superatmospheric pressure will also be employed. At temperatures below 35 degrees centigrade, the reaction rates are generally so low as to be unworthy of consideration. At higher temperatures above about 120 degrees centigrade, undesirable chlorination may occur.

The product of the reaction, when equimolecular quantities of starting material and fluorinating agent are used is a material having a single fluorine replacing a single bromine in the starting material. Replacement of more than one bromine can be accomplished, if desired, by using a higher temperature and an excess of fluorinating agent. However, under these conditions, substantial quantities of undesirable by-products may also be produced.

The following examples are set forth to further illustrate, but are not to be construed to limit, this invention.

EXAMPLES

*Example 1.*—To a Monel flask equipped with a stirrer and a reflux condenser were added, 0.075 gram mole $SbCl_5$ and 0.3 gram mole $SbF_5$ to produce 0.375 gram mole $SbF_4Cl$. The flask and its contents were heated to about 70 degrees centigrade for about 30 min. and 0.3 gram mole $CF_3CBr_3$ was then added to the mixture through the reflux condenser. At a reflux temperature of about 40 degrees centigrade, the mixture was heated for one hour. After reflux, products and bromine were distilled from the reaction mixture over a temperature range of from about 35 degrees centigrade to about 50 degrees centigrade. Bromine was washed from the distillate with cold, aqueous NaOH. Recovery was made of crude product in the amount of about 50 percent by weight of the $CF_3CBr_3$ charged. Vapor phase chromatography indicated a crude product composition as follows:

| | Mole percent |
|---|---|
| $CF_3CBr_2F$ | 90.0 |
| $CF_3CBr_2Cl$ | 3.8 |
| $CF_3CBrCl_2$ | 1.9 |
| $CF_3CBrClF$ | 4.3 |

*Example 2.*—To a Monel flask equipped with a stirrer and a reflux condenser were added 0.075 gram mole $SbCl_5$ and 0.3 gram mole $SbF_5$. The flask and its contents were heated to about 70 degrees centigrade and stirred for about 30 minutes. Seventy-two grams of $CF_2BrCHBr_2$ were then added to the flask and the mixture was stirred. After heating at a reflux temperature of about 50 degrees centigrade for about thirty minutes, product was removed by distillation over a range of from about 40 degrees centigrade to about 75 degrees centigrade. Bromine was removed from the product by washing with cold, aqueous NaOH. Sixty grams of crude product representing a recovery of about 83 percent were analyzed by vapor phase chromatography which indicated the following composition:

| | Mole percent |
|---|---|
| $CBrF_2CHBrF$ | 9.5 |
| $CF_3CHBrF$ | 7.6 |
| Unidentified | 1.9 |

*Example 3.*—In substantially the same manner as shown in Examples 1 and 2, $CF_3CHBr_2$ was fluorinated in a Monel flask using $SbF_4Cl$. There was a recovery of 91 percent crude product based on the $CF_3CHBr_2$ charged. Vapor phase chromatography indicated the following analysis of the crude product:

| | Mole percent |
|---|---|
| $CF_3CHBrF$ | 85 |
| $CF_3CHF_2$ | 11 |
| $CF_3CHBr_2$ | 1 |
| Unidentified, remainder. | |

Various modifications may be made in the present invention without departing from the spirit or scope thereof, and it is to be understood that I limit myself only as defined in the appended claims.

I claim:
1. A process for the fluorination of a polyhaloethane having the formula $CF_2XCBr_2Y$, wherein X is an element selected from the group consisting of fluorine and bromine, and Y is an element selected from the group consisting of bromine and hydrogen, comprising, heating said polyhaloethane with $SbF_4Cl$ at a temperature from about 35 to about 120 degrees centigrade thereby to replace at least a part of the bromine in said polyhaloethane with fluorine.

2. A process for the fluorination of a polyhaloethane having the formula $CF_2XCBr_2Y$, wherein X is an element selected from the group consisting of fluorine and bromine, and Y is an element selected from the group consisting of bromine and hydrogen, comprising, heating said polyhaloethane with $SbF_4Cl$ at the reflux temperature of the reaction mixture thereby to replace at least a part of the bromine in said polyhaloethane with fluorine.

3. A process for the fluorination of a polyhaloethane having the formula $CF_2XCBr_2Y$, wherein X is an element selected from the group consisting of fluorine and bromine, and Y is an element selected from the group consisting of bromine and hydrogen, comprising, heating said polyhaloethane with $SbF_4Cl$ at a temperature from about 50 to 75 degrees centigrade thereby to replace at least a part of the bromine in said polyhaloethane with fluorine.

4. A process for the fluorination of a polyhaloethane having the formula $CF_2XCBr_2Y$, wherein X is an element selected from the group consisting of fluorine and bromine, and Y is an element selected from the group consisting of bromine and hydrogen, comprising adding, with heat and stirring, an approximately stoichiometric amount of said polyhaloethane to a quantity of $SbF_4Cl$; heating the reaction mixture thus formed at the reflux temperature thereof, thereby to replace at least a part of the bromine in said polyhaloethane with fluorine; and removing products from the mixture.

5. A process for the fluorination of a polyhaloethane having the formula $CF_2XCBr_2Y$, wherein X is an element selected from the group consisting of fluorine and bromine, and Y is an element selected from the group consisting of bromine and hydrogen, comprising adding, with heat and stirring, an approximately stoichiometric amount of said polyhaloethane to a quantity of $SbF_4Cl$; heating the reaction mixture thus formed at a reflux temperature of from about 35 degrees centigrade to about 75 degrees centigrade for a time of from about 20 minutes to about an hour and a half; and removing products from the mixture.

6. A process for the fluorination of $CF_3CBr_3$ comprising, heating 0.3 gram mole $CF_3CBr_3$ with 0.375 gram mole $SbF_4Cl$ at the reflux temperature of the reaction mixture for about one hour, and removing the products from the reaction mixture.

7. A process for the fluorination of $CF_2BrCHBr_2$ comprising, heating 0.24 gram hole $CF_2BrCHBr_2$ with 0.375 gram mole $SbF_4Cl$ at the reflux temperature of the reaction mixture for about one half hour, and removing the products from the reaction mixture.

8. A process for the fluorination of $CF_3CHBr_2$ comprising, heating $CF_3CHBr_2$ with $SbF_4Cl$ at the reflux temperature of the reaction mixture thereby to replace at least a part of the bromine in $CF_3CHBr_2$ with fluorine, and removing the products from the reaction mixture.

References Cited by the Examiner

UNITED STATES PATENTS

| 2,510,872 | 6/1950 | Downing et al. | 260—653.8 |
| 2,667,518 | 1/1954 | Wrightson et al. | 260—653.7 |
| 2,862,036 | 11/1958 | Baranauckas et al. | 260—653.8 |
| 2,921,099 | 1/1960 | Chapman et al. | 260—653 |

FOREIGN PATENTS 534,527   10/1955   Italy.

OTHER REFERENCES

Lovelace et al.: Aliphatic Fluorine Compounds, Reinhold Publishing Co., New York (1958), pp. 7–10.

LEON ZITVER, *Primary Examiner.*

DANIEL D. HORWITZ, *Examiner.*